April 17, 1956 J. F. MOORE ET AL 2,742,639

SIGNAL COMPARISON SYSTEMS

Filed Feb. 21, 1951 2 Sheets-Sheet 1

INVENTORS
JOHN FITZALLEN MOORE
BRADFORD M. TORREY
BY Elmer J. Gorn
ATTORNEY

April 17, 1956 J. F. MOORE ET AL 2,742,639

SIGNAL COMPARISON SYSTEMS

Filed Feb. 21, 1951 2 Sheets-Sheet 2

INVENTORS
JOHN FITZALLEN MOORE
BRADFORD M. TORREY
BY Elmer J. Gorn
ATTORNEY

United States Patent Office 2,742,639

Patented Apr. 17, 1956

2,742,639

SIGNAL COMPARISON SYSTEMS

John Fitzallen Moore, Acton, and Bradford M. Torrey, Arlington, Mass., assignors to Raytheon Manufacturing Company, Newton, Mass., a corporation of Delaware Application February 21, 1951, Serial No. 212,094

6 Claims. (Cl. 343—13)

This invention relates to a signal-comparison system, and more particularly to a radar system wherein an object-echo signal is received and compared with a signal reference to determine the distance of the object from the radar system. In radar systems used for rapidly detecting moving objects such as aircraft, it has been found desirable to make the searching operation automatic so that an object may be automatically tracked or its position automatically indicated.

Systems have been devised wherein a moving gate passes the object-echo signal, the output of the gate, in turn, being used to control a servo system which moves the gate with the object-echo signal to maintain said signal accurately positioned in said gate. This system is relatively slow for the purpose of locating an object, since during the search operation the gate must be repeatedly moved through a range of time positions which correspond to distances of the object-echo from the radar system. It is believed apparent that the rate at which this gate may be moved is limited by the width of the gate, the sensitivity of the receiver and the strength of the reflected signals from the object. For example, if the gate is moved too rapidly past the range of the object, an insufficient signal will be built up to cause the gate to lock on said signal.

This invention discloses an automatic search arrangement wherein the need of a movable gate for automatically locating an object signal is eliminated. This is accomplished by providing a plurality of fixed gate channels, each covering different portions of the range distance with each channel actuating an indicating device whereby the position of the object signal, and hence the range of the object, may be determined within the accuracy roughly equal to the width of the channel gate.

This invention further discloses that the accuracy of the stage of channels may be further improved by providing a second stage comprising a plurality of gate channels, the total width of the plurality of gate channels of the second stage being substantially equal to the width of a gate channel of the first stage. When a signal appears in a gate channel of the first stage, it actuates a switching device which connects all the gate channels of the second stage to the channel of the first stage in which the signal appears. The signal thus passes into the second stage of gate channels, and is admitted only by a discrete gate channel which opens at the same time as the signal which appears at the output of the channel of the first stage. The appearance of a signal in a channel of the second stage may then be used to actuate a switching mechanism which connects a third stage comprising a plurality of gate channels to the second stage, the total width of the gate channels of the third stage being substantially equal to the gate width of a single channel of the second stage. The number of stages may be further increased for increased accuracy, if so desired.

Other and further advantages of the invention will be apparent as the description thereof progresses, reference being had to the accompanying drawings, wherein.

Figure 1:
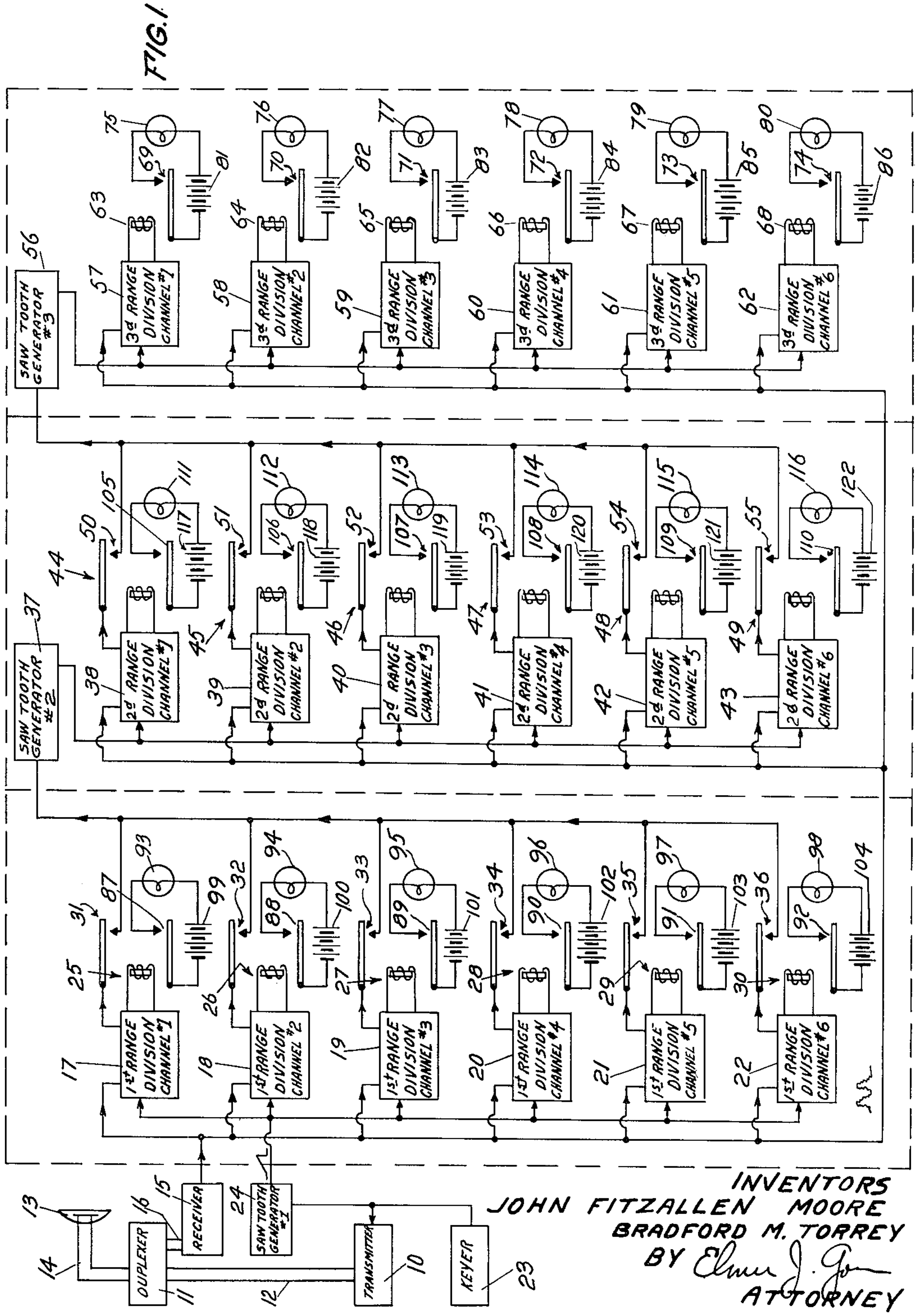
Fig. 1 illustrates a functional, flow diagram of a system embodying this invention.

Referring now to Fig. 1, there is shown a transmitter 10 which may be, for example, of the well-known microwave-pulse type, the output of transmitter 10 being fed to a duplexer 11 through a wave guide 12. The output of duplexer 11 is fed to an antenna 13 through a wave guide 14, antenna 13, in turn, radiating the energy into space. Received energy from object reflections is then picked up by antenna 13 and fed through wave guide 14 and duplexer 11 to a receiver 15 through a wave guide 16. Receiver 15 may be of the well-known radar-receiver type, and may have, for example, a square-law detector such that the output of the receiver 15 is a video signal containing the envelope of the reflected object signals. This video information is simultaneously fed to a plurality of range-division channels, for example, as shown here, six in number, as indicated at 17 through 22, respectively.

These channels constitute a first stage of the object-location system, and comprise channels having time-operated gates so adjusted that the gates open substantially successively, the second gate 18, for example, opening as the gate 17 closes. This is accomplished, for example, in the following manner.

Keyer 23 is used to generate pulses which trigger the transmitter 10, said pulses simultaneously triggering a saw-tooth generator 24. Saw-tooth generator 24 may be of any desired type, a particularly useful example of which will be described presently in connection with Fig. 3. The output of saw-tooth generator 24 is a wave form which increases substantially linearly with time, said wave form being fed simultaneously to the channels 17 through 22. The gates of successive channels 17 through 22 are opened in response to successively increased voltages such that the times of opening of the successive channels are spaced substantially equally apart.

By adjusting the duration of the open gate of each channel to substantially the time interval between openings of successive channel gates, or by making said channel gate widths somewhat greater than said time intervals, the entire desired range of object distances may be covered for every pulse generation of the transmitter 10.

As shown here, each of channels 17 through 22 actuates a relay, as shown at 25 through 30, respectively. Each of relays 25 through 30 has two pairs of normally open contacts. A first of the pairs of contacts 31 through 36, respectively, of relays 25 through 30, respectively, has one of the contacts thereof connected to the respective signal channels 17 through 22, and the other contacts thereof connected in parallel, and to the input of a second saw-tooth generator 37 similar to saw-tooth generator 24. Thus, it may be seen that, when a video signal from receiver 15 passes through one of channels 17 through 22, respectively, and actuates one of the relays 25 through 30, saw-tooth generator 37 will be triggered, and, as may be seen later from the description of Fig. 2, saw-tooth generator 37 will be triggered substantially simultaneously with the opening of the gate of the particular channel whose relay is energized.

The output of saw-tooth generator 37 is fed simultaneously to a plurality of channels 38 through 43 which are also fed by the output of receiver 15. Channels 38 through 43 are similar to channels 17 through 22, except that the width of the gates of channels 38 through 43 are only a fraction as wide as gates 17 through 22. As a result, the gates of channels 38 through 43 which are opened substantially successively in response to the saw-tooth wave form from generator 37 will cover a total gate width substantially equal to the width of one of the gates of channels 17 through 22. Thus, it may be seen that the gates of the second-stage channels 38 through 43 will only be opened during the period when the channel which energized the relay to trigger generator 37 was opened, and in which the object signal appeared.

The object signal will now appear also in one of the channels 38 through 43, and will actuate a relay connected to said channel. The relays of channels 38 through 43 are indicated at 44 through 49, respectively. Relays 44 through 49 each has two pairs of normally open contacts similar to relays 25 through 30. One pair of contacts 50 through 55 has one contact thereof connected to its respective channel, and the other contact of each of the pairs 50 through 55 connected in parallel, and to the input of a third saw-tooth generator 56. Saw-tooth generator 56 is similar to generators 24 and 37, and has the output thereof connected to channels 57 through 62, respectively. Channels 57 through 62 are similar to channels 17 through 22, and 38 through 43, but have gates whose widths are a fraction of the widths of the gates of channels 38 through 43.

The gates of channels 57 through 62 are opened successively by the saw-tooth wave form from generator 56 such that the total gate width covered by channels 57 through 62 is substantially equal to the width of the gate of one of the channels 38 through 43. The output of receiver 15 is also connected to the inputs of channels 57 through 62 such that when a channel of the second stage has a signal occurring therein, and its relay is energized, the gates of channels 57 through 62 will be opened during the open time of the gate of the channel of the group 38 through 43 whose relay is energized. The video signal, therefore, which energized a channel of the group 17 through 22, and the channel of the group 38 through 43 will also appear in a gate of one of the channels 57 through 62, and will energize a relay of the group 63 through 68 which are energized, respectively, by the appearance of a signal at the outputs of channels 57 through 62.

Relays 63 through 68 each has a single pair of contacts 69 through 74, respectively, which actuates an indicating device upon energization of the relays 63 through 68. As shown here, by way of example, the indicating device is a plurality of lights 75 through 80 connected, respectively, through contacts 69 through 74, in series, with batteries 81 through 86, respectively, such that, when a signal appears at the output of one of the channels 57 through 62, the lamp of the group 75 through 80 associated with said channel will light, thereby indicating that a signal appears in said channel.

Similarly, relays 25 through 30 have contacts 87 through 92, respectively, which connect lamps 93 through 98, respectively, in series, with batteries 99 through 104, respectively, upon the appearance of a signal in one of the channels 17 through 22, respectively.

Similarly, relays 44 through 49 have second contact pairs 105 through 110, respectively, which connect lamps 111 through 116, respectively, in series, with batteries 117 through 122, respectively, upon the appearance of a signal in one of the channels 38 through 43, respectively.

Thus, for a particular object-echo signal three of the lamps will light one from each stage of channels, thereby indicating the position of the object. It is to be clearly understood that the lamps shown here as indicating means are by way of example only, and that any desired utilization circuit, such as a computing device, could be substituted therefor.

Figure 2:
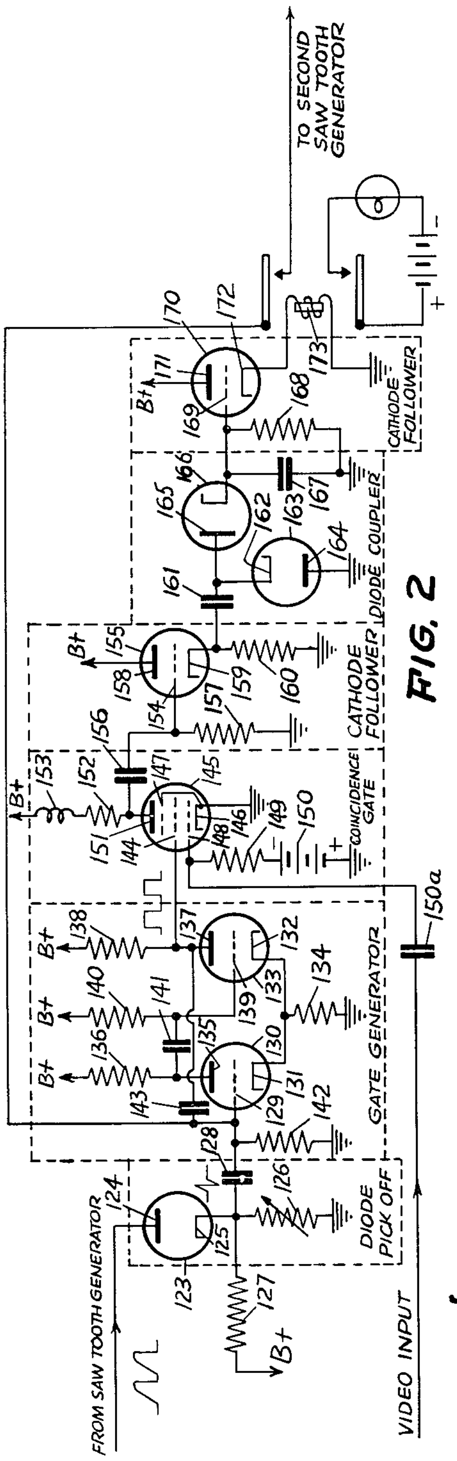
Fig. 2 illustrates a schematic diagram of a type of range-division gate channel which could be used in the system illustrated in Fig. 1.

Referring now to Fig. 2, there is shown a circuit diagram of an electrical circuit which could be used for any of the gating channels of Fig. 1. The input from the saw-tooth generator is fed into a pick-off diode 123, for example, as shown here, to the plate 124 thereof. The cathode 125 of diode 123 is connected through a variable resistor 126 to ground. Cathode 125 is also connected through a resistor 127 to B+. By adjusting variable resistor 126, any desired positive voltage may be applied to the cathode 125.

When the saw-tooth wave form from the saw-tooth generator which is applied to the plate 124 exceeds the voltage applied to the cathode 125, diode 123 will conduct, producing a positive output pulse at cathode 125. This pulse is fed from cathode 125 through a coupling condenser 128 to the grid 129 of a triode 130 comprising one half of a gate generator. The gate generator may be of any desired type, for example, as shown here, a one-kick multivibrator.

The cathode 131 of tube 130 is connected to the cathode 132 of tube 133 comprising the other half of the gate generator. Cathodes 131 and 132 are connected to ground through a cathode-load resistor 134. A plate 135 of tube 130 is connected to B+ through a plate-load resistor 136, and the plate 137 of tube 133 is connected to B+ through a plate load resistor 138. The grid 139 of tube 133 is connected to B+ through a resistor 140, and to the plate 135 of tube 130 through a condenser 141. The grid 129 of tube 130 is connected to ground through a grid-leak resistor 142, and to the plate 137 of tube 133 through a coupling condenser 143. This gate generator operates in the following manner.

The tube 133 is normally conducting heavily since the grid 139 is connected to B+ through resistor 140. As a result, the plate 137 is at a very low potential, and the drop between the plate 137 and the cathode 132 is very low. Due to the current drawn through the common cathode-resistor 134, tube 130 is normally cut off. When a positive pulse is coupled to grid 129 from the cathode 125 of the pick-off diode 123, tube 130 conducts, driving grid 139 of the tube 133 into cutoff. This condition continues until the condenser 141 discharges sufficiently through the grid-resistor 140 and the plate-load resistor 136 to bring grid 139 out of cutoff. What this occurs, grid 129 is driven into cutoff, and tube 133 again conducts heavily.

Whenever tube 133 is cut off, a positive voltage pulse occurs at the plate 137 thereof. This pulse is fed to the screen grid 144 of a coincidence-gating tube 145 by directly connecting screen grid 144 to plate 137. The cathode 146 and suppressor grid 147 of tube 145 are grounded The grid 148 is connected to ground through a grid-load resistor 149 and a bias battery 150 in series.

Video signals are fed to grid 148 from the radar receiver 15 through a coupling condenser **150*a*. The bias applied to the grid 148 is so arranged that, in the absence of a pulse applied to the screen grid 144, substantially no video signals will be passed by the tube 145. When a pulse is applied from the gate generator to the screen grid 144, the tube 145 is rendered conductive and will pass signals to the plate 151 of tube 145 which is connected to B+ through a resistor 152 and a choke 153 in series, choke 153** merely serving to increase the high-frequency response.

Plate 151 is connected to the grid 154 of a cathode follower 155 through a coupling condenser 156. Grid 154 is connected to ground through a grid-load resistor 157. The plate 158 of cathode follower 155 is connected to B+, and the cathode 159 thereof is connected to ground through a cathode-load resistor 160. The output of cathode follower 155 feeds a diode coupler whose purpose is to add up the voltage of successive video pulses passed by the coincidence-gating tube 145.

The diode coupler comprises a condenser 161 connected between the cathode 159 of the cathode follower 155 and the cathode 162 of a clamping diode 163, the plate 164 of which is grounded. Cathode 162 is also connected to the plate 165 of a diode 166, the cathode of which is connected to ground through a condenser 167. The operation of the diode coupler is as follows.

Condenser 167 is made several times as large as the condenser 161. Thus, when the cathode 159 of cathode follower 155 is driven negative by a video pulse, condenser 161 is discharged by a voltage equal to that by which the potential of cathode 159 is reduced. This occurs since the condenser 161 is effectively connected from the cathode 159 to ground, due to the action of clamping diode 163. However, when the cathode 159 again moves positive, tube 163 is rendered nonconductive, and condenser 161 must now be charged through a circuit comprising the condenser 167 and the diode 166. Thus, the change in charge is substantially all transferred to the condenser 167. Since condenser 167 is much larger than the condenser 161, this results in only a fraction of the voltage change appearing across condenser 167 than that which appeared across condenser 161. This occurs every time a pulse is fed to the cathode follower 155, and hence the charge in condenser 167 builds up in proportion to the number of pulses passed by the coincidence-gating tube 145, and in proportion to their amplitude.

A discharge path for condenser 167 is provided in the form of a resistor 168 in parallel therewith. Thus, if the signals in the video channel are merely sporadically appearing noise signals, the condenser 167 will charge to no great extent, while if the video signals are constantly recurring pulses, such as are received from an object echo, the charge on condenser 167 will build up to a point substantially above that of noise signals.

The cathode of diode 166 is connected to the grid 169 of a cathode follower 170, the plate 171 of which is connected to B+, and cathode 172 of which is connected through the solenoid 173 of a relay to ground. The relay corresponds to any of the relays illustrated in Fig. 1, and has its associated contacts therewith for energizing the indicating lamp and transferring the triggering signals to the saw-tooth generator which actuates the following stage of channels.

The triggering signal which is fed to the following saw-tooth generator through the contacts of the relay is driven from the grid 129 of tube 130 of the gate generator. By adjusting the values of the various circuit parameters, the width of the gate and the length of time required to build up sufficient voltage to actuate the relay may be adjusted as desired. By adjusting the variable resistor 126, the time of triggering of the gate generator may be adjusted.

Figure 3:
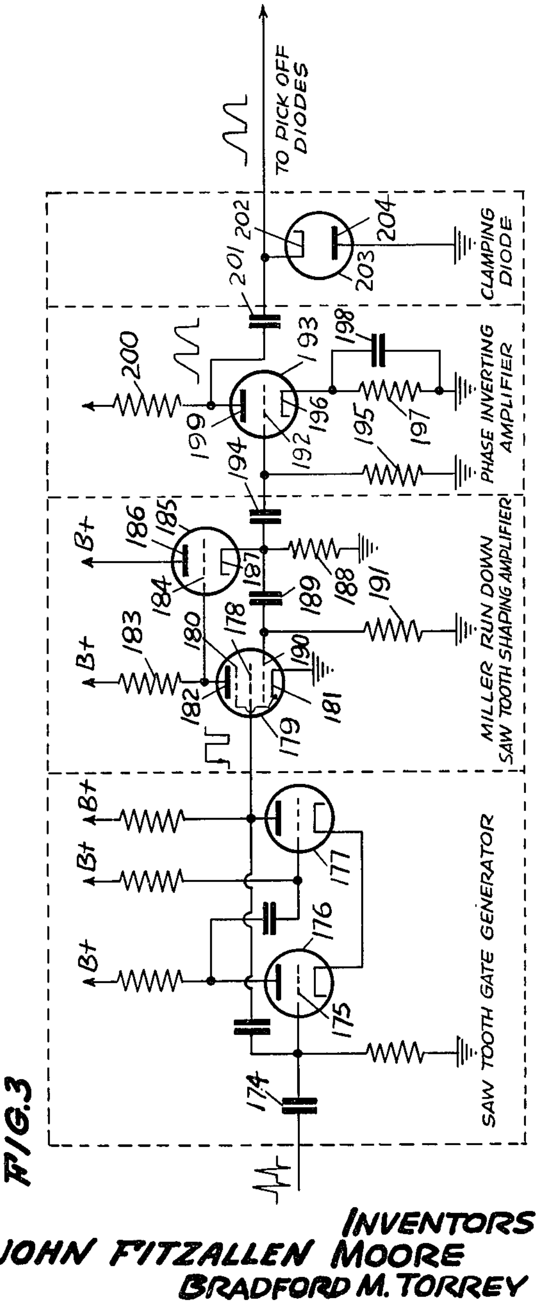
Fig. 3 illustrates a schematic diagram of a saw-tooth generator which could be used in the system of Fig. 1.

Referring now to Fig. 3, there is shown a saw-tooth generator which may be used for any of the saw-tooth generators illustrated in Fig. 1. The input trigger signal is fed through a condenser 174 to the grid 175 of a triode 176 comprising one stage of a saw-tooth gate generator. The other stage comprises a triode 177, the associated circuits used with triodes 176 and 177 being substantially the same as those used with tubes 130 and 133 of the gate generator, and the operation is in substantially the same manner.

The resulting gate pulse is fed to the screen grid 178 of a Miller run-down saw-tooth shape amplifier pentode 179. The suppressor grid 180 and cathode 181 of tube 179 are grounded. The plate 182 thereof is connected to B+ through a plate-load resistor 183 and to the grid 184 of the cathode follower 185. The plate 186 of the cathode follower 185 is connected to B+, and the cathode 187 is connected to ground through a load resistor 188. Cathode 187 is also connected through a condenser 189 to the grid 190 of tube 179. Grid 190 is also connected to ground through a grid-charging resistor 191.

The operation of this type of circuit is of a well-known variety wherein the application of a positive, rectangular pulse to the screen grid 178 causes the condenser 189 to charge substantially linearly through the resistor 191 and the cathode follower 185, producing a rising saw-tooth wave form. When the pulse is removed from the screen grid 178, the condenser discharges rapidly through the cathode follower 185 and the grid 190 of tube 179 which draws grid current from the cathode 181. The cathode 187 of the cathode follower 185, which has a negative-going saw-tooth wave form thereon, is coupled to the grid 192 of an amplifier 193 through a coupling condenser 194. Grid 192 is returned to ground through a grid-load resistor 195. The cathode 196 of amplifier 193 is connected to ground through a cathode-bias resistor 197 by-passed by a condenser 198. The plate 199 of amplifier 193 is connected through a plate-load resistor 200 to B+. Plate 199 is also connected through a coupling condenser 201 to the cathode 202 of a clamping diode 203, the plate 204 of which is grounded. The cathode 202 of the clamping diode 203 now has thereon a positive-going saw-tooth wave form which is fed to the pick-off diode 123 of the stage of channels fed by the particular saw-tooth generator.

In the second and third stages of the channels of Fig. 1, it is desirable that the saw-tooth generator have successively more rapid rises, in order to insure good accuracy of pick-off by the diodes. However, it is desirable that the gating pulse produced by the saw-tooth generator be of substantially the same width for all the gate generators. In this condition, if a second channel in any of the stages is energized after a first channel has already been energized and is triggering the saw-tooth generator of the following stage, the trigger pulse from the second channel will be inoperative to retrigger the saw-tooth generator. As a result, only the first object picked up by the device will be measured by the system of gates, thus eliminating confusion as to which channel is picking up the object. This same function could be also accomplished by either a mechanical or an electrical interlock between the relays of any stage such that, when one relay of a stage has been actuated, the remaining relays are rendered inoperative to be actuated.

This completes the description of the particular embodiment of the invention illustrated herein. However, many modifications will be apparent to persons skilled in the art without departing from the spirit and scope of this invention. For example, any number of stages, or any number of channels per stage, may be used depending upon the accuracy desired. The system is not necessarily limited to radar applications, but could be useful for many other purposes, such as communications. The particular electronic circuits shown in Figs. 2 and 3 are by way of example only, and any desired circuits performing the same functions could be used. Therefore, it is desired that this invention be not limited by the particular details described herein, except as defined by the appended claims.

What is claimed is:

1. A range-measuring system comprising a source of signals, a signal reference, means fed by said signal reference and said source for comparing said signals with said signal reference comprising a first stage comprising a plurality of channels, each channel being responsive to a different degree of time difference of a characteristic of said signals and said reference, and a second stage coupled to said first stage, said second stage comprising a plurality of channels fed by a discrete channel of said first stage.

2. A range-measuring system comprising means for radiating signals from a source, means for receiving object-reflection signals, means for determining time difference between said radiated and reflected signals comprising a first stage comprising a plurality of channels, each channel being responsive to a different degree of time difference corresponding to a different range, and a second stage coupled to said first stage, said second stage comprising a plurality of channels fed by a discrete channel of said first stage.

3. A range-measuring system comprising means for radiating signals from a source, means for receiving object-reflection signals, means for determining time difference between said radiated and reflected signals comprising a first stage comprising a plurality of channels, each channel being responsive to a different degree of time difference, and a second stage coupled to said first stage, said second stage comprising a plurality of channels fed by a discrete channel of said first stage and responsive to different sub-division of said difference of said discrete channel.

4. A range-measuring system comprising means for radiating signals from a source, means for receiving object-reflection signals, means for comparing said object-reflection signals with signals derived from said source comprising a first stage comprising a plurality of channels, each channel being responsive to a different degree of time difference of a characteristic of said signals, and means responsive to a signal in a discrete channel of said first stage for connecting a second stage to said discrete channel.

5. A range-measuring system comprising means for radiating signals from a source, means for receiving object-reflection signals, means for comparing said object-reflection signals with signals derived from said source comprising a first stage comprising a plurality of channels, each channel being responsive to a different degree of time difference of a characteristic of said signals, the degrees of difference of adjacent channels having a substantially common boundary, and means responsive to a signal in a discrete channel of said first stage for indicating the presence of a signal in said discrete channel.

6. A range-measuring system comprising means for radiating signals from a source, means for receiving object-reflection signals, means for comparing said object-reflection signals with signals derived from said source comprising a first stage comprising a plurality of parallel input connected channels, each channel being responsive to a different degree of time difference of a characteristic of said signals, and means responsive to a signal in a discrete channel of said first stage for connecting a second stage of parallel input connected channels to said discrete channel and for indicating the presence of a signal in said discrete channel.

References Cited in the file of this patent

UNITED STATES PATENTS

| | | |
|---|---|---|
| 1,633,100 | Heising | June 21, 1927 |
| 1,711,658 | Sprague | May 7, 1929 |
| 2,118,518 | Neumann | May 24, 1938 |
| 2,403,527 | Hershberger | July 9, 1946 |
| 2,406,165 | Schroeder | Aug. 20, 1946 |
| 2,408,415 | Donaldson | Oct. 1, 1946 |
| 2,478,670 | Skellett | Aug. 9, 1949 |
| 2,478,919 | Hansell | Aug. 16, 1949 |
| 2,543,736 | Trevor | Feb. 27, 1951 |
| 2,572,216 | Taylor | Oct. 23, 1951 |
| 2,617,984 | Coykendall | Nov. 11, 1952 |

FOREIGN PATENTS

| | | |
|---|---|---|
| 601,125 | Great Britain | Apr. 28, 1948 |